United States Patent
Zimmermann

(10) Patent No.: US 6,296,904 B1
(45) Date of Patent: Oct. 2, 2001

(54) PAINTER'S MASKING TAPE AND ITS USE

(75) Inventor: Dieter Zimmermann, Jork (DE)

(73) Assignee: Beiersdorf AG, Hamburg (DE)

(*) Notice: Subject to any disclaimer, the term of this patent is extended or adjusted under 35 U.S.C. 154(b) by 0 days.

(21) Appl. No.: 09/294,857

(22) Filed: Apr. 20, 1999

(30) Foreign Application Priority Data

Apr. 29, 1998 (DE) .............................................. 198 19 108

(51) Int. Cl.$^7$ ....................................................... C09J 7/02
(52) U.S. Cl. ...................... 427/208.4; 442/151; 428/343; 428/355 BL
(58) Field of Search .................................... 428/343, 356, 428/355 BL, 354; 427/208.4; 442/151

(56) References Cited

U.S. PATENT DOCUMENTS

| | | | |
|---|---|---|---|
| 4,988,550 | * 1/1991 | Keyser et al. | 428/40 |
| 5,227,225 | * 7/1993 | Mamish | 428/214 |
| 5,246,773 | * 9/1993 | Mamish | 428/286 |
| 5,464,692 | 11/1995 | Huber . | |
| 5,516,581 | 5/1996 | Kreckel et al. . | |
| 6,042,882 | * 3/2000 | Deeb et al. | 427/208.4 |

FOREIGN PATENT DOCUMENTS

| | | |
|---|---|---|
| 33 31 016 | 10/1984 | (DE) . |
| 410674 | 1/1991 | (EP) . |

OTHER PUBLICATIONS

Abstract of DE 33 31 016. Oct. 11, 1994.

* cited by examiner

Primary Examiner—Daniel Zirker
(74) Attorney, Agent, or Firm—Norris McLaughlin & Marcus

(57) ABSTRACT

Use of an adhesive film which is detachable by pulling in the direction of the bond plane and
a) whose self-adhesive composition is based on thermoplastic rubber and tackifying resins, the said adhesive film having high elasticity and low plasticity, the adhesion being lower than the cohesion, the adhesiveness largely disappearing when the film is extended and the ratio of peel force to tear load being 1:1.5 or more, and
b) which carries an extensible nonwoven laminated onto one side of the adhesive composition,
as a painter's decorative tape which can be removed again by pulling without residue or damage.

7 Claims, No Drawings

PAINTER'S MASKING TAPE AND ITS USE

The invention relates to the use of an adhesive film which is etachable by pulling in the direction of the bond plane as a painter's asking tape and to a painter's masking tape of this kind.

Painter's adhesive tapes are known, obtainable commercially, and in widespread use by both professional and home decorators. The majority of them are self-adhesive tapes with a backing of paper, which may have been creped or otherwise pretreated. Problems arise with such tapes especially in the course of their subsequent redetachment and also when they are applied non-linearly, in which case stresses in the material lead to partial lifting of the tape and the ingress of paint, varnish or the like under Also known, however, are strippable adhesive tapes which can be peeled off again without damage by pulling in the direction of the bond plane. Double-sided adhesive films of this kind are on the market as tesa Power Strips® (stretch-releasable adhesive tapes). Products of this kind are described in U.S. Pat. No. 4,024,312, DE 33 31 016 C2, DE 3714 453 C1, WO 92/11332, U.S. Pat. No. 5,516,581, U.S. Pat. No. 5,672,402, DE 42 22 849 C1, WO 95/06691;DE 44 28 587 C2, DE 44 31 914 A1, WO 97/07172, EP 761,793 A2 and DE 197 08 366. In general, the focus of the products described therein is on double-sided adhesive fixing tapes for bonding two substrates.

However, there have also been proposals to use such strippable adhesive tapes for masking as well. Thus in U.S. Pat. No. 5,516,581 column 2, line 46 et seq. it is stated that, although the major use is in the categories of "mounting" and "joining", "labeling" and "masking" would also be appropriate; in this context, however, the structure of the product with its highly extensible sheet backing (column 3, line 40 et seq.) is disadvantageous in terms of cost, production, and use, for example, as painter's masking tape.

The object of the invention is to remedy this situation and, in particular, to provide an inexpensive, uncomplicated and practical painter's masking tape which at the same time can be stripped off again without residue or damage after it has been used.

The present invention relates to a masking tape comprising:
  a) a self-adhesive composition based on thermoplastic rubber and tackifying resins; and
  b) an extensible nonwoven adhered to one side of said self-adhesive composition;
the masking tape capable of being detached from a surface to which it is adhered by pulling on the masking tape in the direction of the plane of the bond formed between the masking tape and said surface.

The self-adhesive composition is based on thermoplastic rubber and tackifying resins, and can be formed as an adhesive film which exhibits high elasticity and low plasticity, which exhibits an adhesion which is lower than its cohesion, which exhibits an adhesiveness which largely disappears when the adhesive film is extended, and which exhibits a ratio of peel force to tear load of at least 1:1.5. The self-adhesive composition may contain one or more antioxidants, UV stabilizers, colorants, fillers and/or auxiliaries.

The self-adhesive composition is covered on one side with a nonwoven, which is, in particular, a polymeric nonwoven. The nonwoven may have a basis weight of 10–40 g/m$^2$, in particular a basis weight of 15–25 g/m$^2$.

For use, the inventive masking tape can be applied to a surface to be painted to mask said surface. The surface is then painted, and the masking tape thereafter removed by pulling on the masking tape in the direction of the plane of the bond formed between the masking tape and said surface. The inventive masking tape is suitable for non-linear masking, wherein the masking tape is not applied to the surface to be painted in a straight-line.

A particularly suitable adhesive composition is one as described in DE 33 31 016 C2, reference being made particularly to the example. A further example is as follows, especially suitable as a single-layer extruder composition:

|  |  | Initial weight: |
|---|---|---|
| Shell: | CARIFLEX TR 1101 (thermoplastic rubber elastomer) | 230,000 kg |
| Shell: | CARIFLEX TR 1107 S (thermoplastic rubber elastomer) | 235,000 kg |
| Hercules: | PENTALYN H (penterythritol ester of hydrogenated natural resin) | 500,000 kg |
| Ciba: | STAB-IRGANOX 1010 (phenolic-based antioxidant) | 5,000 kg |
| Ciba: | WESTON 399 (thioether-based antioxidant) | 5,000 kg |
| Ciba: | CHIMASSORB 944 (amine-type UV light absorber) | 5,000 kg |
|  | TITANDIOXID 21600 (titanium dioxide) | 20.000 kg |

After compounding in a twin-screw extruder, coating takes place preferably through a slot die onto dried release paper in a thickness of in particular 0.3–0.4 mm. The coating is simultaneously covered with an approximately 20 g/m$^2$ extensible polymeric spunbonded nonwoven.

When used as a painter's masking tape, in the course of the final stripping operation the paint-soiled nonwoven separates from the backing and can be disposed of separately.

Suitable nonwovens are spunbonded nonwovens consisting of polyester and viscose fibres. The basis weights are ideally from 15 to 30 g/m$^2$, in particular from 20 to 25 g/m$^2$.

What is claimed is:

1. A method of painting a surface, said method comprising the following steps:
   a) providing a masking tape comprising:
      i) a self-adhesive composition based on thermoplastic rubber and tackifying resins; and
      ii) an extensible nonwoven adhered to one side of said self-adhesive composition;
      the masking tape capable of being detached from a surface to which it is adhered by pulling on the masking tape in the direction of the plane of the bond formed between the masking tape and the surface;
   b) applying said masking tape to said surface to mask said surface;
   c) painting said surface;
   d) removing said masking tape from said surface by pulling on the masking tape in the direction of the plane of the bond formed between the masking tape and said surface;
   e) separating paint-soiled nonwoven from said adhesive composition during or following step d); and
   f) disposing of said paint-soiled nonwoven separately from said adhesive composition.

2. The method according to claim 1, wherein the self-adhesive composition comprises one or more ingredients selected from the group consisting of antioxidants, UV stabilizers, colorants, fillers and auxiliaries.

3. The method according to claim 1, wherein the self-adhesive composition is formed as a film having a thickness of 0.3–0.4 mm.

4. The method according to claim 1, wherein the nonwoven has a basis weight of 10–40 g/m².

5. The method according to claim 1, wherein the nonwoven has a basis weight of 15–25 g/m².

6. The method according to claim 1, wherein the nonwoven is a polymeric nonwoven.

7. The method according to claim 1, wherein the masking tape is not applied to said surface in a straight-line.

\* \* \* \* \*

UNITED STATES PATENT AND TRADEMARK OFFICE
CERTIFICATE OF CORRECTION

PATENT NO. : 6,296,904 B1
DATED : October 2, 2001
INVENTOR(S) : Dieter Zimmermann It is certified that error appears in the above-identified patent and that said Letters Patent is hereby corrected as shown below:

<u>Title page,</u>
Item [56], OTHER PUBLICATIONS, change "1994" to -- 1984 --

Signed and Sealed this

Twenty-fourth Day of June, 2003

JAMES E. ROGAN
*Director of the United States Patent and Trademark Office*